US 6,513,753 B1

(12) United States Patent
Toni et al.

(10) Patent No.: US 6,513,753 B1
(45) Date of Patent: Feb. 4, 2003

(54) TRANSMISSION SUPPORT STRUCTURE FOR A ROTARY WING AIRCRAFT

(75) Inventors: Darryl Mark Toni, Madison, CT (US); Christos Kassapoglou, Stratford, CT (US); Jeffrey George Sauer, Woodbury, CT (US); Darrel Duane Hornbaker, Stafford, KS (US)

(73) Assignee: Sikorsky Aircraft Corporation, Stratford, CT (US)

( * ) Notice: Subject to any disclaimer, the term of this patent is extended or adjusted under 35 U.S.C. 154(b) by 0 days.

(21) Appl. No.: 09/930,340

(22) Filed: Aug. 14, 2001

(51) Int. Cl.7 .............................................. B64C 27/00
(52) U.S. Cl. .................................................. 244/17.27
(58) Field of Search ................................ 244/17.27, 39, 244/17.11, 6; 416/204 R, 244 R, 213 R; 74/606 R; 248/539

(56) References Cited

U.S. PATENT DOCUMENTS

| | | | |
|---|---|---|---|
| 4,720,060 A | * | 1/1988 | Yana .......................... 188/379 |
| 4,902,180 A | * | 2/1990 | Gauron ....................... 411/258 |
| 4,930,983 A | | 6/1990 | Byrnes et al. |
| 4,961,687 A | | 10/1990 | Bost et al. |
| 5,145,371 A | * | 9/1992 | Jorneus ....................... 433/173 |
| 5,154,371 A | * | 10/1992 | Grant et al. ............. 244/17.27 |
| 5,310,137 A | * | 5/1994 | Yoerkie et al. ............. 188/379 |
| 5,354,176 A | | 10/1994 | Schilling et al. |
| 5,449,152 A | | 9/1995 | Byrnes et al. |
| 5,562,416 A | | 10/1996 | Schmaling et al. |
| 5,645,400 A | | 7/1997 | Hunter et al. |
| 5,740,987 A | * | 4/1998 | Morris et al. ............. 244/17.11 |
| 5,813,626 A | | 9/1998 | Zoppitelli et al. |
| 5,863,183 A | | 1/1999 | Dierksmeier et al. |
| 5,913,659 A | | 6/1999 | Doolin et al. |
| 5,934,875 A | | 8/1999 | Head |
| 6,138,949 A | | 10/2000 | Manende et al. |
| 6,319,346 B1 | * | 11/2001 | Clark et al. ................. 156/156 |
| 6,394,387 B1 | * | 5/2002 | Mitrovic .................. 244/17.11 |

FOREIGN PATENT DOCUMENTS

GB         2256623 A   * 12/1991   ........... B64C/27/04

* cited by examiner

Primary Examiner—Peter M. Poon
Assistant Examiner—Timothy D Collins
(74) Attorney, Agent, or Firm—Carlson, Gaskey & Olds PC

(57) ABSTRACT

A main rotor support structure assembly includes a support housing which transmits loads developed by the main rotor assembly into the airframe. Integral main rotor servo attachment lugs extend from the cylindrical body member to provide lower attachment points for the rotor servo actuators which are operable to articulate a rotor swash plate or the like. The servo attachment lugs are integrally formed as part of the cylindrical body member and spaced thereabout. A substantially L-shaped metallic insert is sandwiched and bonded within each servo attachment lug to resist axial and transverse tension of the rather high forces exerted by the rotor servo actuators.

20 Claims, 4 Drawing Sheets

TRANSMISSION SUPPORT STRUCTURE FOR A ROTARY WING AIRCRAFT

This invention was made with government support under Contract No.: DAAJ09-91-C-A004 awarded by the Department of the Army. The government therefore has certain rights in this invention.

BACKGROUND OF THE INVENTION

The present invention relates to a support truss that is configured to structurally support a main rotor assembly, and more particularly to a composite material support housing which includes laminate main rotor servo attachment lugs.

The main rotor assembly of a helicopter develops large magnitude dynamic and static longitudinal, lateral, vertical, and torsional loads. Known helicopter design methodology utilizes a support structure to integrate elements of the main rotor assembly such as the rotor mast and the engine transmission with the helicopter airframe. Such support structures also provide main rotor servo attachment lugs which provide lower attachment points for the rotor servo actuators which are operable to articulate a main rotor swash plate.

As the support structure and particularly the attachment lugs must resist large magnitude loads, known support structures are commonly manufactured of rigid lightweight metallic materials such as Titanium. Composite components for such load bearing structures as the support structure have heretofore been unavailable. In particular, the main rotor servo attachment lugs have demonstrated a deficiency using all composite component construction due to the narrow lug geometry required to fit below the main rotor servo housing and above the main rotor transmission case.

Accordingly, it is desirable to provide a support structure which is lightweight, inexpensive, relatively simple to fabricate, and readily secured to the helicopter airframe. It is further desirable to provide main rotor servo attachment lugs which are integral to the support structure and resistant to large magnitude axial and transverse loads.

SUMMARY OF THE INVENTION

The main rotor support structure assembly according to the present invention structurally supports elements of a helicopter main rotor assembly such as a rotor standpipe and rotor transmission with the airframe. The main rotor support structure assembly includes a support housing transmits dynamic and static longitudinal, lateral, vertical, and torsional loads developed by the main rotor assembly into the airframe.

The support housing includes a substantially cylindrical body member and integrally extending support struts. Integral main rotor servo attachment lugs extend from the cylindrical body member substantially parallel to the main rotor axis A. The integral main rotor servo attachment lugs provide lower attachment points for the rotor servo actuators which are operable to articulate a rotor swash plate or the like. The servo attachment lugs are integrally formed as part of the cylindrical body member and spaced thereabout. A substantially L-shaped metallic insert is sandwiched and bonded within each servo attachment lug to resist axial and transverse tension of the rather high forces exerted by the rotor servo actuators.

Applicant has determined that sandwiching the metallic insert within each servo attachment lug provides a synergistic enhancement which resists axial and transverse tension. Yielding of the metallic insert and then final failure of the metallic insert followed initial failure of the composite material. The residual load in the each servo attachment lug after yielding was at least 80% of the peak load which suggests that these configurations have excellent damage tolerance capabilities.

Each servo attachment lug is preferably trimmed along at least a portion of an edge such that an edge of the metallic insert is at least partially exposed through the lug edge. Quality control is thereby improved as inspection of each servo attachment lug will facilitate measurement of metallic insert edge to assure proper manufacturing tolerances are maintained.

The present invention therefore provides a support structure which is lightweight, inexpensive, relatively simple to fabricate, and readily secured to the helicopter airframe. The sandwiched main rotor servo attachment lugs are integral to the support structure and resistant to large magnitude axial and transverse loads.

BRIEF DESCRIPTION OF THE DRAWINGS

The various features and advantages of this invention will become apparent to those skilled in the art from the following detailed description of the currently preferred embodiment. The drawings that accompany the detailed description can be briefly described as follows.

DETAILED DESCRIPTION OF THE PREFERRED EMBODIMENT

Figure 1:
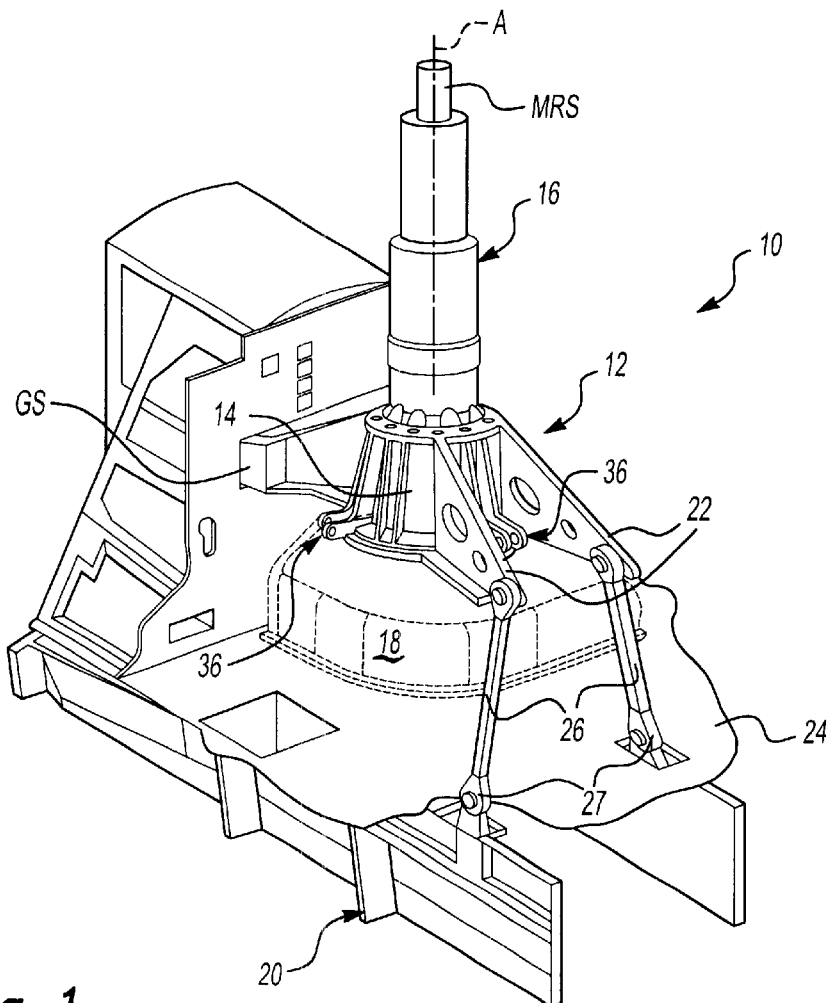
FIG. 1 is a general perspective view of a main rotor support structure assembly for a main rotor assembly according to the present invention.

FIG. 1 illustrates a general perspective view of a main rotor support structure assembly 10 according to the present invention. The main rotor support structure assembly 10 includes a support housing 12 having a substantially cylindrical body member 14 which defines a main axis A about which a main rotor assembly (not shown) rotates. The support housing 12 is preferably a composite component using resin transfer molding Graphite/Epoxy composite materials. Composite materials are manufactured from a plurality of prepreg composite material layers such as woven graphite plys which are selectively arranged and selectively chosen to achieve the desired strength.

Figure 2:
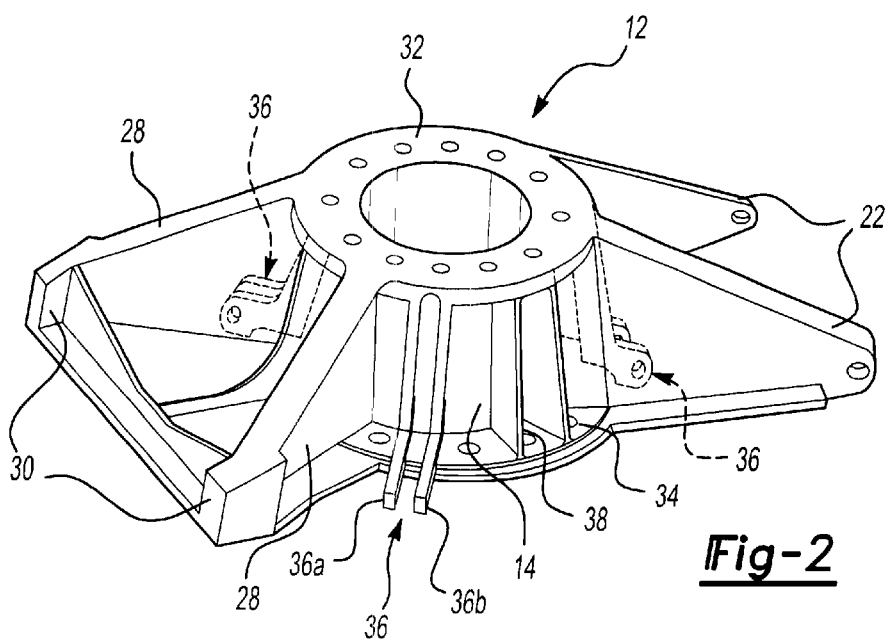
FIG. 2 is general perspective view of a support housing having integral main rotor servo attachment lugs according to the present invention.

The main rotor support structure assembly 10 structurally supports elements of a helicopter main rotor assembly such as a rotor standpipe 16 and rotor transmission 18 with the airframe (illustrated schematically at 20.) At least one support strut 22 (two illustrated) extends from the substantially cylindrical body member 14 for securing the main rotor support structure assembly 10 to a transmission deck 24 mounted to the airframe 20. Preferably, the support struts 22 are composite members integrally formed with the support housing 12 (FIG. 2.) Links 26 interconnect the support struts 22 to the airframe 20 through hard points 27 extending from the airframe 20. The links 26 are mounted to the support struts 22 and hard points 27 via fastening bolts or the like.

The configuration of the support housing 12 transmits dynamic and static longitudinal, lateral, vertical, and torsional loads developed by the main rotor assembly into the airframe 20. The configuration of the main rotor support structure assembly 10 provides multiple transmission paths for such dynamic and static loads into airframe hard points at distinct, spaced-apart load transfer levels or planes of the airframe. A primary load transfer level is a gusset structure GS. A secondary load transfer level is the transmission deck 24 of the helicopter. For further understanding of the GS and load transfer planes, attention is directed to U.S. Pat. No. 5,154,371 which is assigned to the assignee of the instant invention and which is hereby incorporated herein in its entirety.

Referring to FIG. 2, the support housing 12 includes the substantially cylindrical body member 14 and integrally extending support struts 22. A pair of forward facing (relative to the airframe) primary support struts 28 terminating in attachment feet 30 for mounting to airframe structural members of the gusset structure GS (FIG. 1) via securing bolts or the like.

A radially extending rotor standpipe flange 32 extends from an upper end of the cylindrical body member 14 and a radially extending transmission attachment flange 34 extends from the lower end. It should be understood that relative terms such as "left," "right," "forward," "aft," "upper," and "lower" are used herein only with reference to the components as mounted to the airframe and should not be considered limiting. The radially extending rotor standpipe flange 32 and radially extending transmission attachment flange 34 are preferably integrally formed with cylindrical body member 14 such that the support housing 12 is a single integral composite unit. The radially extending rotor standpipe flange 32 secures the rotor standpipe 16 (FIG. 1) and the radially extending transmission attachment flange 34 secures the rotor transmission 18 (FIG. 1) to the support housing 12. Dynamic and static loads of the main rotor assembly are transmitted via the standpipe 16 through the cylindrical body member 14 of the support housing 12. A main rotor shaft MRS (FIG. 1) passes through the rotor standpipe 16 and concentric channel defined by the cylindrical body member 14 for integration with the suspended transmission 18.

The support housing 12 further provides integral main rotor servo attachment lugs 36 extending from the cylindrical body member 14. The integral main rotor servo attachment lugs 36 and a plurality of ribs 38 preferably extend between the radially extending rotor standpipe flange 32 and the radially extending transmission attachment flange 34 substantially parallel to the main rotor axis A of the support housing 12 to provide additional rigidity thereto.

The integral main rotor servo attachment lugs 36 provide lower attachment points for the rotor servo actuators 40 (illustrated schematically in FIGS. 2A and 2B) which are operable to articulate a rotor swash plate or the like. The servo attachment lugs 36 are integrally formed as part of the cylindrical body member 14 and spaced thereabout. An opposed pair of servo attachment lugs 36a, 36b (preferably three pairs; left, right and aft between support struts 22) are located about the cylindrical body member.

Figure 2A:
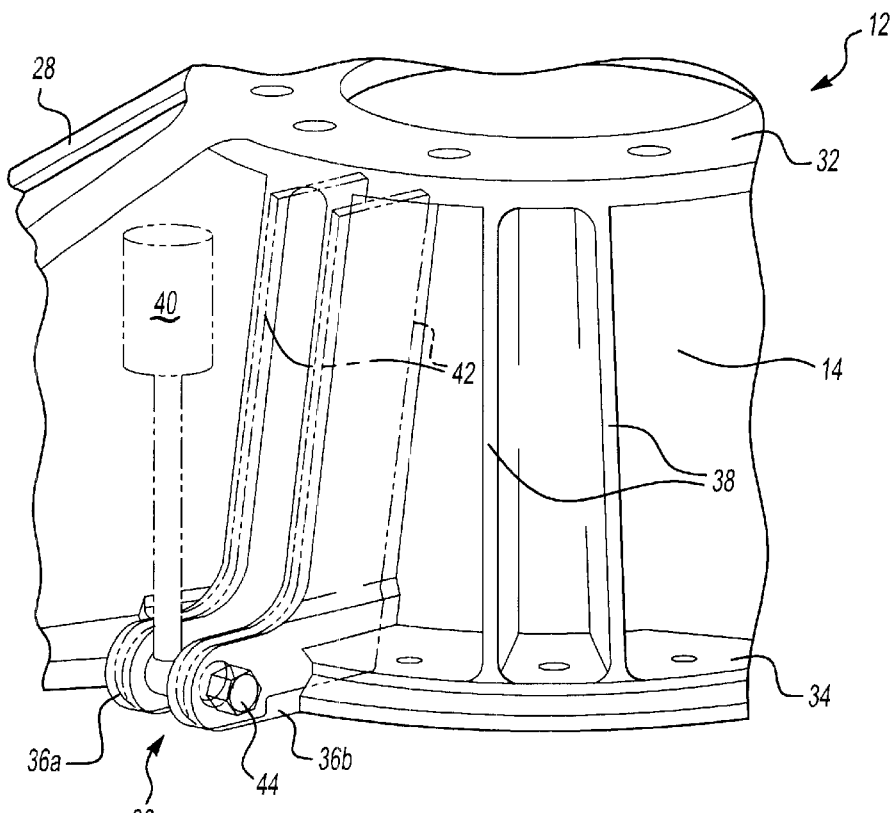
FIG. 2A is general expanded partially phantom perspective view of the main rotor servo attachment lugs according to the present invention.

Referring to FIG. 2A, a substantially L-shaped metallic insert 42 (FIG. 2C) is sandwiched within each servo attachment lug 36a, 36b. The metallic insert is preferably a Titanium alloy to resist axial and transverse tension of the rather high forces exerted by the rotor servo actuators 40 upon the support housing 12. The rotor servo actuator 40 is mounted to extend between each opposed pair of servo attachment lugs 36a, 36b.

Figure 2B:
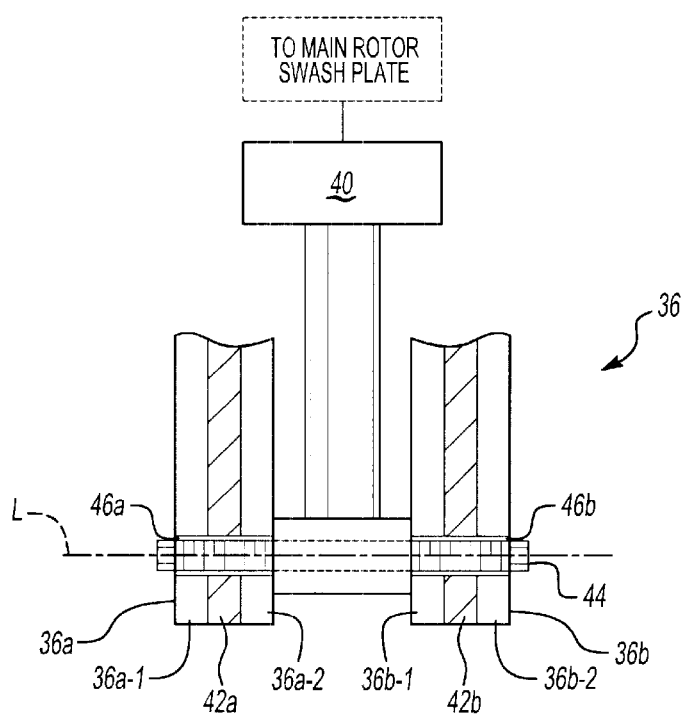
FIG. 2B is frontal sectional view of the main rotor servo attachment lugs.
Figure 2C:
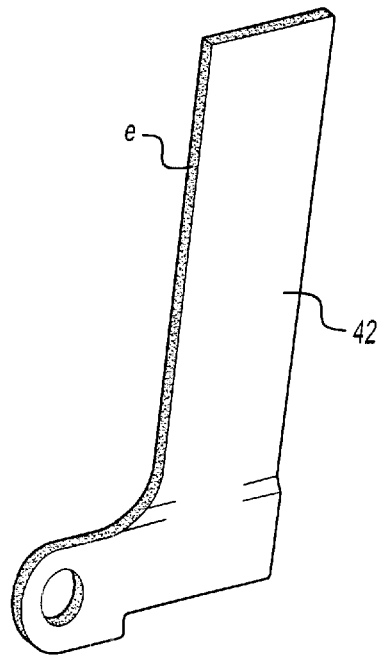
FIG. 2C is general perspective view of a metallic insert for a main rotor servo attachment lug.

Referring to FIG. 2B, a fastener 44 such as a mounting pin, threaded fastener, lock clip or the like extends through an aperture 46a in one of the opposed pair of servo attachment lugs 36a, 36b, through the rotor servo actuator 40 and through an aperture 46B of the other of the opposed pair of servo attachment lugs 36b, 36a. The apertures 46a, 46b of servo attachment lugs 36a, 36b define a lug axis L. That is, the fastener 44 passes through a first composite material layer 36a-1 on a first side of the first servo attachment lug 36a, the first metallic insert 42a, a second composite material layer 36a-2 of the first servo attachment lug 36a, the rotor servo actuator 40, a first composite material layer 36b-1 on a first side of the second servo attachment lug 36b, the second metallic insert 42b, and a second composite material layer 36b-1 of the second servo attachment lug 36b.

In a most preferred embodiment, the metallic insert is bonded within each servo attachment lug 36 during the prepreg layup of the support housing 12 and cocurred therein during final curing of the support housing 12. Proper preparation of the metallic insert surfaces for bonding the graphite is crucial to obtaining high quality parts and avoiding debonding between the composite and metallic layers. The metallic insert 42 is preferably bond prepped in a known manner and a layup film adhesive, preferably 0.06 Wt EA9690, is applied to each side of the metallic insert prior to layup. The aperture 46 is also preferably filled with composite material and then later bored through such that the aperture 46 is also lined with the composite material.

Figure 2D:
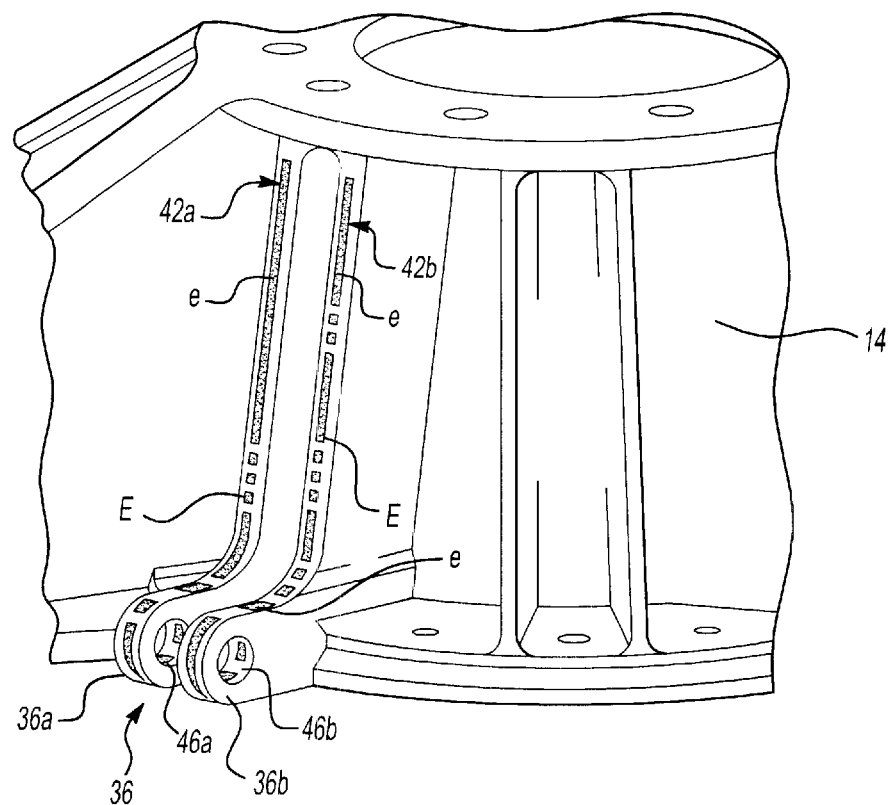
FIG. 2D is general expanded perspective view of the main rotor servo attachment lugs illustrating an exposed edge thereof.

Referring to FIG. 2D, each servo attachment lug 36 is preferably trimmed along at least a portion of its edge E such that an edge e of the metallic insert 42 is at least partially exposed through edge E. Quality control is thereby improved as inspection of each servo attachment lug 36 will facilitate measurement of metallic insert 42 edge e to assure proper manufacturing tolerances are maintained.

Figure 3A:
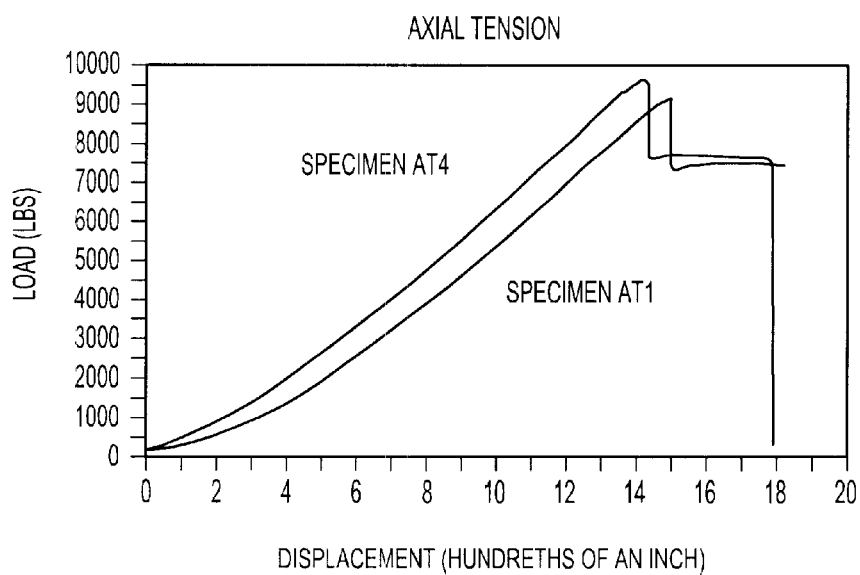
FIG. 3A is a graphical representation of a main rotor servo attachment lug undergoing axial tension until failure.
Figure 3B:
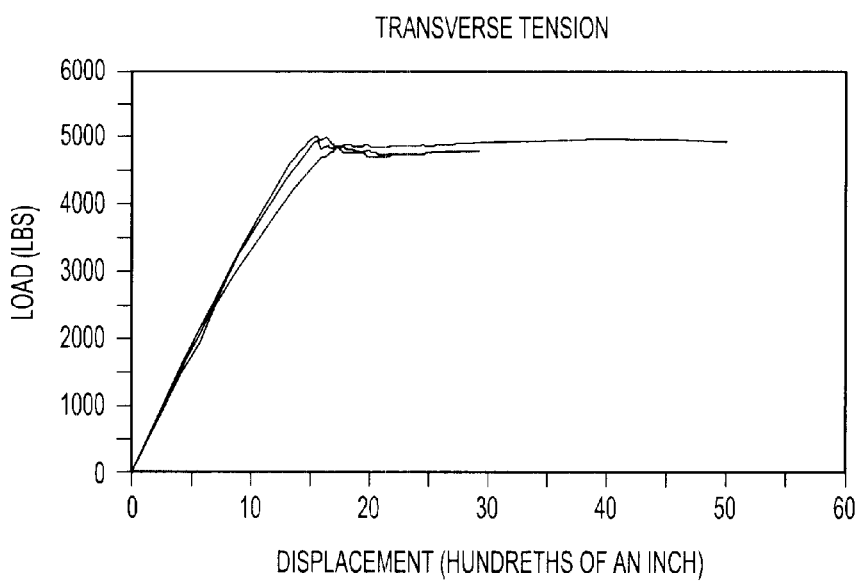
FIG. 3B is a graphical representation of a main rotor servo attachment lug undergoing transverse tension until failure.

Applicant has determined that sandwiching the metallic insert 42 within each servo attachment lug 36 provides a synergistic enhancement which resists axial and transverse tension. Referring to FIG. 3A and 3B, initial failure of the composite material was followed by yielding of the metallic insert and then final failure of the metallic insert. The residual load in the each servo attachment lug 36 after yielding was at least 80% of the peak load which suggests that these configurations have excellent damage tolerance capabilities.

The foregoing description is exemplary rather than defined by the limitations within. Many modifications and variations of the present invention are possible in light of the above teachings. The preferred embodiments of this invention have been disclosed, however, one of ordinary skill in the art would recognize that certain modifications would come within the scope of this invention. It is, therefore, to be understood that within the scope of the appended claims, the invention may be practiced otherwise than as specifically described. For that reason the following claims should be studied to determine the true scope and content of this invention.

What is claimed is:

1. A main rotor support structure assembly, comprising:
   a support housing having a substantially cylindrical body member defining a main axis, said support housing manufactured of a substantially composite material; and
   a main rotor servo attachment lug being manufactured of a substantially composite material having a metallic insert sandwiched substantially within said main rotor servo attachment lug, said main rotor servo attachment lug completely covers each side of said metallic insert.

2. The composite main rotor support structure assembly as recited in claim 1, wherein said metallic insert includes a titanium alloy.

3. The composite main rotor support structure assembly as recited in claim 1, wherein said metallic insert includes a substantially L-shaped member.

4. The composite main rotor support structure assembly as recited in claim 1, further including a second main rotor servo attachment lug having a second metallic insert sandwiched substantially within said second main rotor servo attachment lug, said second main rotor servo attachment lug directly opposed to said main rotor servo attachment lug.

5. The composite main rotor support structure assembly as recited in claim 1, wherein said main rotor servo attachment lug extends substantially parallel to said main axis.

6. The composite main rotor support structure assembly as recited in claim 1, wherein at least a portion of an edge of said metallic insert is exposed through an edge of said main rotor servo attachment lug.

7. The composite main rotor support structure assembly as recited in claim 1, wherein said main rotor servo attachment lug is bonded to each side of said metallic insert.

8. A main rotor support structure assembly, comprising:
   a support housing manufactured of a substantially composite material, said support housing having a substantially cylindrical body member defining a main axis, a radially extending rotor standpipe flange, and a radially extending transmission attachment flange;
   a support strut extending from said housing;
   a first main rotor servo attachment lug being manufactured of a substantially composite material having a first metallic insert sandwiched substantially within said first main rotor servo attachment lug, said first main rotor servo attachment lug bonded to each side of said first metallic insert said first main rotor servo attachment lug completely covers each side of said first metallic insert; and
   a second main rotor servo attachment lug being manufactured of a substantially composite material having a second metallic insert sandwiched substantially within said second main rotor servo attachment lug, said second main rotor servo attachment lug directly opposed and substantially parallel to said first main rotor servo attachment lug, said second main rotor servo attachment lug bonded to each side of said second metallic insert, said second main rotor servo attachment lug completely covers each side of said second metallic insert.

9. The composite main rotor support structure assembly as recited in claim 8, wherein said first and second metallic insert includes a titanium alloy.

10. The composite main rotor support structure assembly as recited in claim 9, wherein said first and second metallic insert includes a substantially L-shaped member.

11. The composite main rotor support structure assembly as recited in claim 8, wherein said first and second main rotor servo attachment lug extend substantially parallel to said main axis.

12. The composite main rotor support structure assembly as recited in claim 8, wherein at least a portion of an edge of said first metallic insert is exposed through an edge of said first main rotor servo attachment lug, and at least a portion of an edge of said second metallic insert is exposed through an edge of said second main rotor servo attachment lug.

13. The composite main rotor support structure assembly as recited in claim 8, further including a plurality of ribs extending between said radially extending rotor standpipe flange and said radially extending transmission attachment flange.

14. The composite main rotor support structure assembly as recited in claim 8, wherein said first and second main rotor servo attachment lug and said first and second metallic insert define a main rotor servo actuator attachment aperture along a lug axis.

15. A helicopter airframe, comprising:
   a support housing manufactured of a substantially composite material, said support housing having a substantially cylindrical body member defining a main axis, a radially extending rotor standpipe flange, and a radially extending transmission attachment flange;
   a support strut extending from said support housing;
   a link mounted between said support strut and an anchor point extending from a transmission deck;
   a first main rotor servo attachment lug having a first metallic insert sandwiched substantially within said first main rotor servo attachment lug, said first main rotor servo attachment lug bonded to each side of said first metallic insert;
   a second main rotor servo attachment lug having a second metallic insert sandwiched substantially within said second main rotor servo attachment lug, said second main rotor servo attachment lug directly opposed and substantially parallel to said first main rotor servo attachment lug, said second main rotor servo attachment lug bonded to each side of said second metallic insert; and
   a rotor servo actuator attached between said first main rotor servo attachment lug and said second main rotor servo attachment lug.

16. The helicopter airframe as recited in claim 15, further comprising a fastener extending through said first main rotor servo attachment lug, said rotor servo actuator and said second main rotor servo attachment lug.

17. The composite main rotor support structure assembly as recited in claim 1, wherein said substantially composite material comprises a substantially non-metallic composite material.

18. The composite main rotor support structure assembly as recited in claim 8, wherein said substantially composite material comprises a substantially non-metallic composite material.

19. The composite main rotor support stricture assembly as recited in claim 1, wherein said substantially composite material comprises Graphite/Epoxy composite materials.

20. The composite main rotor support structure assembly as recited in claim 8, wherein said substantially composite material comprises Graphite/Epoxy composite materials.

* * * * *